United States Patent
Minotani et al.

(10) Patent No.: US 11,280,752 B2
(45) Date of Patent: Mar. 22, 2022

(54) CRACK DETECTION SYSTEM AND CRACK DETECTION METHOD

(71) Applicant: Nippon Telegraph and Telephone Corporation, Tokyo (JP)

(72) Inventors: Tadashi Minotani, Musashino (JP); Eri Matsunaga, Musashino (JP); Soichi Oka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/055,320

(22) PCT Filed: Mar. 8, 2019

(86) PCT No.: PCT/JP2019/018434
§ 371 (c)(1),
(2) Date: Nov. 13, 2020

(87) PCT Pub. No.: WO2019/220986
PCT Pub. Date: Nov. 21, 2019

(65) Prior Publication Data
US 2021/0109050 A1  Apr. 15, 2021

(30) Foreign Application Priority Data

May 14, 2018  (JP) .............................. JP2018-093186

(51) Int. Cl.
*G01N 27/02* (2006.01)
(52) U.S. Cl.
CPC ..... *G01N 27/028* (2013.01); *G01N 2291/018* (2013.01); *G01N 2291/101* (2013.01)

(58) Field of Classification Search
CPC ....... G01N 2291/018; G01N 2291/101; G01N 27/028
See application file for complete search history.

(56) References Cited

U.S. PATENT DOCUMENTS

| 10,267,755 | B2* | 4/2019 | Kishi | ................. G01R 31/2824 |
| 2015/0008942 | A1* | 1/2015 | Ginther | ................ H04R 29/005 324/658 |

OTHER PUBLICATIONS

International Search Report dated Jul. 16, 2019, issued in PCT Application No. PCT/JP2019/018434, filed May 8, 2019.
(Continued)

*Primary Examiner* — Alesa Allgood
(74) *Attorney, Agent, or Firm* — Workman Nydegger

(57) ABSTRACT

Provided are a crack detection system and a crack detection method that distinguish between a case where a crack is generated in a structure and other cases not to bring about erroneous detection. In a sensor terminal that detects, from a crack generated in a transducer provided on a structure, a crack in the structure, the transducer having a three-layered structure of conductor-insulator-conductor, the crack detection system including: an impedance measurement unit that measures impedance between the two conductors of the transducer; and a crack detection processing unit that calculates, from a frequency characteristic of the impedance, periodicity data regarding periodicity of a frequency at which impedance becomes a peak, and detects a presence of a crack in the structure in a case of periodicity data different from initially-measured periodicity data being included.

11 Claims, 6 Drawing Sheets

(56) References Cited

OTHER PUBLICATIONS

Kurabo Industries Ltd., *KK Crack Sensor*, Web literature, searched Apr. 26, 2018, https://www.kurabo.co.jp/chem/kk_crack_sensor.html.

Takao Harada et al., *Study on Crack Detection of Civil Infrastructures by Using PVDF Film Sensor*, Structural Engineering: A, vol. 59A, 2013, pp. 47-55.

* cited by examiner (a) STATE WHERE NO CRACK EXISTS AND NO ATTACHMENT EXISTS AT END OF TRANSMISSION LINE (b) STATE WHERE NO CRACK EXISTS AND ATTACHMENT EXISTS AT END OF TRANSMISSION LINE (c) STATE WHERE CRACK EXISTS

CRACK DETECTION SYSTEM AND CRACK DETECTION METHOD

TECHNICAL FIELD

The present invention relates to a technique for detecting a crack in a structure.

BACKGROUND ART

In order to detect a crack in a structure, there is a method of visiting a site where the structure is constructed and inspecting the crack with eyes or by using a device (Non-Patent Literature 1). However, according to such a method, it is costly for a person to visit the site, and it is not possible to achieve uninterrupted detection on the structure. In order to achieve uninterrupted detection on the crack in the structure, there is a method of monitoring a crack in a structure by attaching a sensor to the structure as disclosed in Non-Patent Literature 2. However, according to Non-Patent Literature 2, since a commercially available sensor having a predetermined shape is used, it is difficult to apply the sensor to various structures having many different shapes.

Therefore, a sensor has been considered in which a transducer 40 for a sensor as shown in FIG. 7 is coated on a structure 5 or a soft film-like transducer 40 is stuck to the structure 5 to detect a change in electrical characteristics of the transducer due to the presence or absence of a crack. With such a sensor, the transducer 40 can be formed according to a shape of the structure, the sensor can be applied to various structures having many different shapes.

When the transducer 40 is configured by three layers of conductor 41-insulator 42-conductor 43 as shown in FIG. 8, one terminal A of a sensor terminal 1 is connected to the upper conductor 41, and the other terminal B is connected to the lower conductor B in contact with the structure 5, so that a frequency characteristic of impedance between the terminals can be measured and a crack can be detected by a change in the frequency characteristic of the impedance (Japanese Patent Application No. 2017-240606).

When the transducer of three-layered structure of conductor-insulator-conductor coated on the structure without cracks is modelled as a transmission line, a circuit model is represented as shown in FIG. 9 in which a terminal A and a terminal B of the sensor terminal are connected to one pair of terminals A and B of a transmission line L and the other pair of terminals C and D of the transmission line L is open. Impedance Zt viewed from the pair of terminals A and B is represented by Equation (A-1).

Formula 1

$$Z_t = Z_0 \coth(\gamma L t) \quad (A\text{-}1)$$

In Equation (A-1), Zo represents characteristic impedance of the transmission line, γ represents a propagation constant (a complex number), and Lt represents a length of the transmission line. Here, when $\gamma = \alpha + j\beta$ where α is a damping constant (real number), β is a phase constant (real number), and j is $(-1)^{0.5}$, Equation (A-1) can be expanded as indicated by Equation (A-2).

Formula 2

$$Zt = Zo \coth(\gamma Lt) = Zo \frac{\cosh(\gamma Lt)}{\sinh(\gamma Lt)} = Zo \frac{\cosh(\alpha Lt + j\beta Lt)}{\sinh(\alpha Lt + j\beta Lt)} = \\ Zo \frac{\cosh(\alpha Lt)\cosh(j\beta Lt) + \sinh(\alpha Lt)\sinh(j\beta Lt)}{\sinh(\alpha Lt)\cosh(j\beta Lt) + \cosh(\alpha Lt)\sinh(j\beta Lt)} = \\ Zo \frac{\cosh(\alpha Lt)\cos(\beta Lt) + j\sinh(\alpha Lt)\sin(j\beta Lt)}{\sinh(\alpha Lt)\cos(\beta Lt) + j\cosh(\alpha Lt)\sin(j\beta Lt)} \quad (A\text{-}2)$$

When inductance per unit length of the transmission line is defined as Lo, capacitance is defined as Co, a circular constant is defined as π, and a frequency is defined as ω/2π, a relation of $\beta = \omega(LoCo)^{0.5}$ is known from a theory of a distributed constant circuit. In Equation (A-2), impedance has a frequency characteristic that periodically becomes a peak due to a trigonometrical function having $\beta Lt = \omega(LoCo)^{0.5}Lt$ included in a denominator and a numerator as a variable.

The reason why a period at which the impedance becomes a peak is related to the length Lt of the transmission line is because the pair of terminals C and D serve as reflection points of electromagnetic waves and standing waves are generated between the pair of terminals A and B and the pair of terminals C and D. When a crack is generated in the structure, since the crack serves as a reflection point of electromagnetic waves and the frequency of the standing wave changes, the frequency at which the impedance becomes a peak changes.

When the structure to be detected is located outdoors, water may adhere to an end of the transducer due to raindrops or the like. Further, even when the structure is located indoors, water may adhere to the end of the transducer due to dew condensation or the like. In this case, the transducer is represented as a circuit model as shown in FIG. 10 in which a parasitic capacitance Cp is connected to the pair of terminals C and D of the transmission line L due to adhesion of water. The impedance viewed from the pair of terminals A and B at this time is represented by Equation (A-3) using $\gamma = \alpha + j\beta$.

Formula 3

$$Zt = Zo \coth(\gamma Lt + j\omega CpZo) = \\ Zo \frac{\cosh(\gamma Lt + j\omega CpZo)}{\sinh(\gamma Lt + j\omega CpZo)} = Zo \frac{\cosh\{\alpha Lt + j(\beta Lt + \omega CpZo)\}}{\sinh\{\alpha Lt + j(\beta Lt + \omega CpZo)\}} = \\ Zo \frac{\cosh(\alpha Lt)\cos(\beta Lt + \omega CpZo) + j\sinh(\alpha Lt)\sin(\beta Lt + \omega CpZo)}{\sinh(\alpha Lt)\cos(\beta Lt + \omega CpZo) + j\cosh(\alpha Lt)\sin(\beta Lt + \omega CpZo)} \quad (A\text{-}3)$$

In Equation (A-3), a variable of the trigonometrical function included in a denominator and a numerator is $\beta Lt + \omega pZo$, and the frequency of the standing wave at which the impedance becomes a peak also depends on the parasitic capacitance Cp. Compared with the frequency of the standing wave when there is no parasitic capacitance Cp as represented by Equation (A-2), the frequency of the standing wave during existence of the parasitic capacitance Cp changes. In addition, the frequency of the standing wave also changes as a dielectric constant of the insulator changes due to temperature/humidity or changes over time.

CITATION LIST

Non-Patent Literature

Non-Patent Literature 1: "Crack detection tool for concrete structure, KK CRACK SENSOR", KURABO Industries Ltd., [online], [Searched on Apr. 26, 2018], <URL:http://www.kurabo.co.jp/division/chem/san05/index.html>

Non-Patent Literature 2: Harada, et al., two others "Study on crack detection of civil infrastructures by using PVDF film sensor", Journal of Structural Engineering, Vol. 59A (March, 2013), Japan Society of Civil Engineers, p. 47-p. 45.

SUMMARY OF THE INVENTION

Technical Problem

In this way, not only when a crack is generated in a structure, but also when a dielectric such as water adheres to an end of a transducer or the dielectric changes with temperature/humidity or over time, a frequency of a standing wave changes. Therefore, it is necessary to distinguish between the case where the dielectric such as water adheres to the end of the transducer, the dielectric changes with temperature/humidity or over time, and the case where the crack is generated.

An object of the present invention, which has been made in view of such circumstances, is to provide a crack detection system and a crack detection method that distinguish between a case where a crack is generated in a structure and other cases not to bring about erroneous detection.

Means for Solving the Problem

In order to solve the above-described problems, the invention according to claim 1 provides a crack detection system that detects, from a crack generated in a transducer provided on a structure, a crack in the structure, the transducer having a three-layered structure of conductor-insulator-conductor, the crack detection system including: an impedance measurement unit that measures impedance between the two conductors of the transducer; and a crack detection processing unit that calculates, from a frequency characteristic of the impedance, periodicity data regarding periodicity of a frequency at which impedance becomes a peak, and detects a presence of a crack in the structure in a case of periodicity data different from initially-measured periodicity data being included.

A crack detection system according to claim 2 is the crack detection system of claim 1 in which the crack detection processing unit is configured to: in an initial scan state, acquire frequency characteristic of impedance within a predetermined frequency range, store a histogram as periodicity data in an impedance periodicity data storage portion, the histogram indicating a difference between frequencies at which impedance becomes a peak from the acquired frequency characteristic of impedance, determine a specific frequency to be monitored in a steady state using a predetermined method, and store the specific frequency and peak value data of impedance at the specific frequency in a monitoring frequency storage portion; in a steady monitoring state, determine a frequency of an AC signal output from the impedance measurement unit based on the specific frequency stored in the monitoring frequency storage portion, generate output transmission data, receives impedance data transmitted from the impedance measurement unit after transmitting the output transmission data to the impedance measurement unit, transition to a crack detection scan state when a magnitude of the impedance included in the impedance data is equal to or smaller than a predetermined threshold value, and continue processing in the steady monitoring state when the magnitude of the impedance is not equal to nor less than the predetermined threshold value; in a crack detection scan state, acquire a frequency characteristic of impedance within a predetermined frequency range; in a peak periodicity calculation state, generate a histogram indicating a difference between frequencies at which impedance becomes a peak from the frequency characteristic of the impedance acquired in the crack detection scan state, compare the histogram with the periodicity data stored in the impedance periodicity data storage portion, determine that a crack exists in the structure and then transition to a crack detection determination state when a frequency variance in a difference between frequencies that becomes a peak is large, and transition to the steady monitoring state when the frequency variance in the difference between the frequencies that becomes a peak is small; and in a crack detection determination state, generate data at least including information indicating that a crack exists and transmit the data.

A crack detection system according to claim 3 is the crack detection system of claim 1 or 2 in which the impedance measurement unit includes a variable frequency signal source that determines a frequency based on data for designating a frequency from the crack detection processing unit and outputs an AC signal to the transducer, a quadrature demodulation portion that extracts, from an AC voltage applied to the transducer, an in-phase component and a quadrature component based on a reference signal of the variable frequency signal source and outputs a quadrature amplitude signal, and an impedance calculation portion that calculates impedance from the quadrature amplitude signal, generates impedance data at least including data of the impedance, and transmits the impedance data to the crack detection processing unit.

A crack detection system according to claim 4 is the crack detection system of any one of claims 1 to 3 in which the different periodicity data is data regarding a difference in length from both ends of the transducer to a crack in the transducer.

A crack detection system according to claim 5 is the crack detection system of any one of claims 1 to 4 in which the crack detection processing unit is configured to detect that no crack exists in the structure and an attachment is present between the two conductors of the transducer when in the frequency characteristic of the impedance, a peak frequency of impedance is different from an initially measured peak frequency and frequency differences between peak frequencies are constant.

A crack detection method according claim 6 is a crack detection method of detecting, from a crack generated in a transducer provided on a structure, a crack in the structure, the transducer having a three-layered structure of conductor-insulator-conductor, the crack detection method including: by an impedance measurement unit, measuring impedance between the two conductors of the transducer; and by a crack detection processing unit calculating, from a frequency characteristic of the impedance, periodicity data regarding periodicity of a frequency at which impedance becomes a peak, and detecting a presence of a crack in the structure in a case of periodicity data different from initially-measured periodicity data being included.

Effects of the Invention

According to the present invention, it is possible to provide a crack detection system and a crack detection method that distinguish between a case where a crack is generated in a structure and other cases (a case where no crack is generated, a case where a dielectric such as water adheres to an end of a transducer, and a case where the dielectric changes with temperature/humidity or over time) not to bring about erroneous detection.

DESCRIPTION OF EMBODIMENTS

An embodiment of the present invention will be described with reference to the drawings.
Configuration of Sensor Terminal 1

Figure 1:
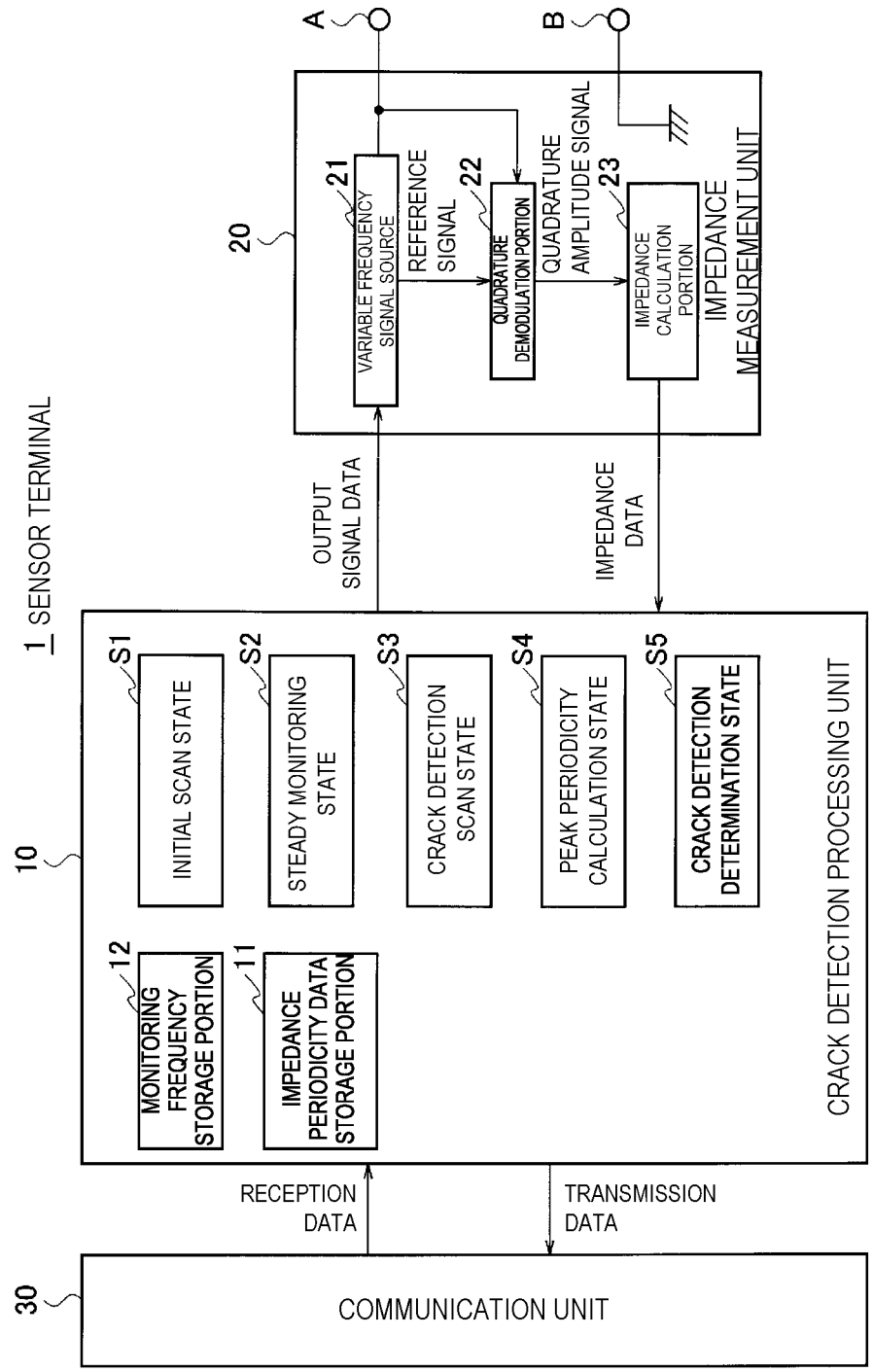
FIG. 1 is a diagram showing a configuration of a sensor terminal.

FIG. 1 shows a sensor terminal 1 according to an embodiment of the present invention. The sensor terminal 1 includes a crack detection processing unit 10, an impedance measurement unit 20, and a communication unit 30. The sensor terminal 1 functions as a crack detection system that detects a crack in a structure from a crack generated in a rectangular transducer of three-layered structure of conductor-insulator-conductor provided on the structure.
Configuration and Function of Crack Detection Processing Unit 10

As shown in FIG. 1, the crack detection processing unit 10 has any state of an initial scan state S1, a steady monitoring state S2, a crack detection scan state S3, a peak periodicity calculation state S4, and a crack detection determination state S5 which can transition, and includes an impedance periodicity data storage portion 11 and a monitoring frequency storage portion 12.

The crack detection processing unit 10 has a functions of calculating, from a frequency characteristic of impedance of the transducer measured by the impedance measurement unit 20, periodicity data regarding the periodicity of a frequency at which the impedance becomes a peak, and detecting the presence of cracks in the structure in a case of periodicity data different from initially-measured periodicity data being included.

The crack detection processing unit 10 has a function of detecting the fact that the structure has no cracks and an attachment is present between two conductors of the transducer when in the frequency characteristic of the impedance of the transducer measured by the impedance measurement unit 20, the peak frequency of the impedance is different from the initially measured peak frequency and frequency differences between the peak frequencies are constant.

The crack detection processing unit 10 has a function of detecting the fact that the insulator of the transducer changes due to temperature and humidity or changes over time when in the frequency characteristic of the impedance of the transducer measured by the impedance measurement, the peak frequency of the impedance is different from the initially measured peak frequency.
Configuration and Function of Impedance Measurement Unit 20

Figure 8:
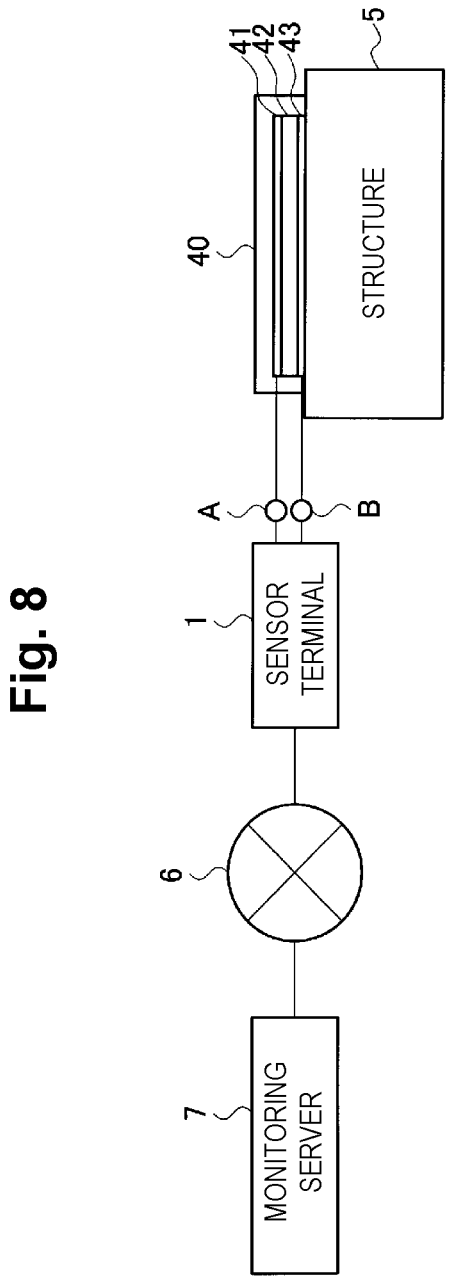
FIG. 8 is a diagram showing a configuration example of a whole system including a sensor terminal.
Figure 9:
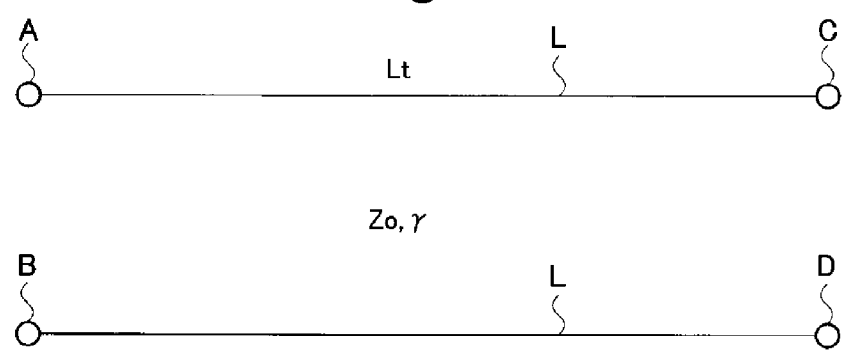
FIG. 9 is a diagram showing a circuit model of a transducer.
Figure 10:
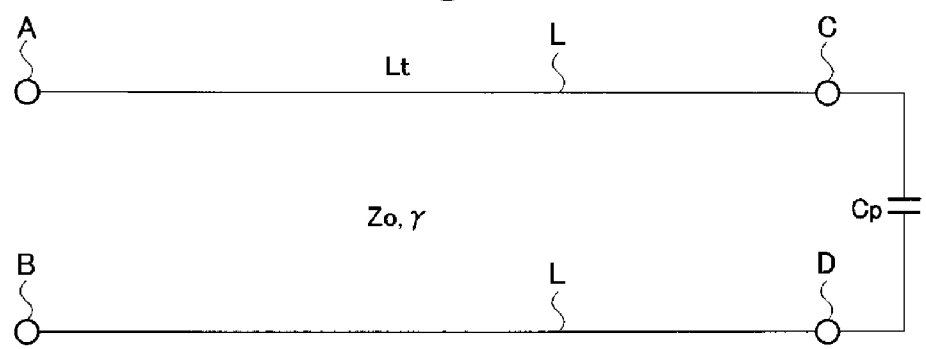
FIG. 10 is a diagram showing a circuit model of a transducer in which an attachment adheres to an end of the transducer.

As shown in FIGS. 1 and 8, the impedance measurement unit 20 includes a terminal A and a terminal B configured to be connected to an upper conductor 41 of a transducer 40 of three-layered structure of conductor-insulator-conductor and a lower conductor 43 in contact with a structure 5, respectively.

The impedance measurement unit 20 has a function of measuring impedance of a specific frequency designated by the crack detection processing unit 10 in the steady monitoring state S2, and measuring impedance of a predetermined frequency range designated by the crack detection processing unit 10 in the initial scan state S1 and the crack detection scan state S3.

The impedance measurement unit 20 includes a variable frequency signal source 21, a quadrature demodulation portion 22, an impedance calculation portion 23, as shown in FIG. 1, to measure the frequency characteristic of the impedance of the transducer of three-layered structure of conductor-insulator-conductor.

The variable frequency signal source 21 has a function of determining a frequency based on frequency designation data from the crack detection processing unit 10, and outputting an AC signal to the transducer.

The quadrature demodulation portion 22 has a function of extracting, from an AC voltage applied to the transducer, an in-phase component and a quadrature component based on a reference signal of the variable frequency signal source 21 and outputting a quadrature amplitude signal.

The impedance calculation portion 23 has a function of calculating impedance from the quadrature amplitude signal, generating impedance data including at least data of the impedance, and transmitting the impedance data to the crack detection processing unit 10.
Function of Communication unit 30

The communication unit 30 has a function of transmitting transmission data such as the detection result of the crack detection processing unit 10 to the outside and receiving reception data to be received from the outside by the crack detection processing unit 10. The outside is, for example, a monitoring server 7 connected via a communication network 6 as shown in FIG. 8.
Detailed Function of Crack Detection Processing Unit 10

In the initial scan state S1, first, the crack detection processing unit 10 acquires the impedance of the transducer within a predetermined frequency range. The crack detection processing unit 10 generates periodicity data of the frequency at which the impedance becomes a peak from the frequency characteristic of the acquired impedance (a histogram indicating a difference in the frequency at which impedance becomes a peak is the periodicity data), stores the periodicity data in the impedance periodicity data storage portion 11, determines a specific frequency to be monitored in the steady monitoring state S2 using a predetermined method, and stores the specific frequency and peak value data of the impedance at the frequency in the monitoring frequency storage portion 12. Such a predetermined determination method may be a method of determining a minimum frequency out of the frequencies at which the impedance becomes a peak or an N-th frequency.

In the steady monitoring state S2, the crack detection processing unit 10 determines a frequency of the AC signal output from the variable frequency signal source 21 of the impedance measurement unit 20 based on the data of the specific frequency of the monitoring frequency storage portion 12, generates output transmission data, and transmits the data to the variable frequency signal source 21. Thereafter, the crack detection processing unit 10 receives the impedance data from the impedance calculation portion 23 of the impedance measurement unit 20. When a magnitude of the impedance included in the received impedance data is equal to or smaller than a predetermined threshold value, the crack detection processing unit 10 transitions to the crack detection scan state S3. When the magnitude of the impedance is not equal to nor less than the predetermined threshold value, the crack detection processing unit 10 is continuously in the steady monitoring state S2. In the steady monitoring state S2, an intermittent operation is implemented in which starting at a predetermined time interval and stopping after the above operation are repeated.

In the crack detection scan state S3, the crack detection processing unit 10 acquires data indicating the frequency characteristic of the impedance within a predetermined frequency range.

In the peak periodicity calculation state S4, the crack detection processing unit 10 generates, from the frequency characteristic of the impedance acquired in the crack detection scan state S3, periodicity data of the frequency at which the impedance becomes a peak. When the periodicity of the frequency, at which the impedance becomes a peak, generated in the crack detection scan state S3 has periodicity different by comparison of the periodicity data of the frequency, at which the impedance becomes a peak, generated in the crack detection scan state S3 with the periodicity data of the frequency, at which the impedance becomes a peak, stored in the impedance periodicity data storage portion 11, the crack detection processing unit 10 determines that a crack exists and then transitions to the crack detection determination state S5. When the periodicity of the frequency, at which the impedance becomes a peak, generated in the crack detection scan state S3 does not have different periodicity, the crack detection processing unit 10 determines that no crack exists and then transitions to the steady monitoring state S2.

In the crack detection determination state S5, the crack detection processing unit 10 generates data including at least information indicating that a crack exists and transmits the data to the outside.

Principle of Crack Detection

Figure 2:
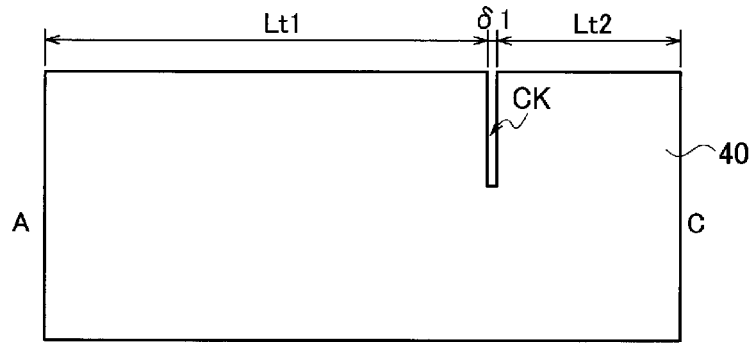
FIG. 2 is a top view of a transducer in which a crack is generated.
Figure 3:
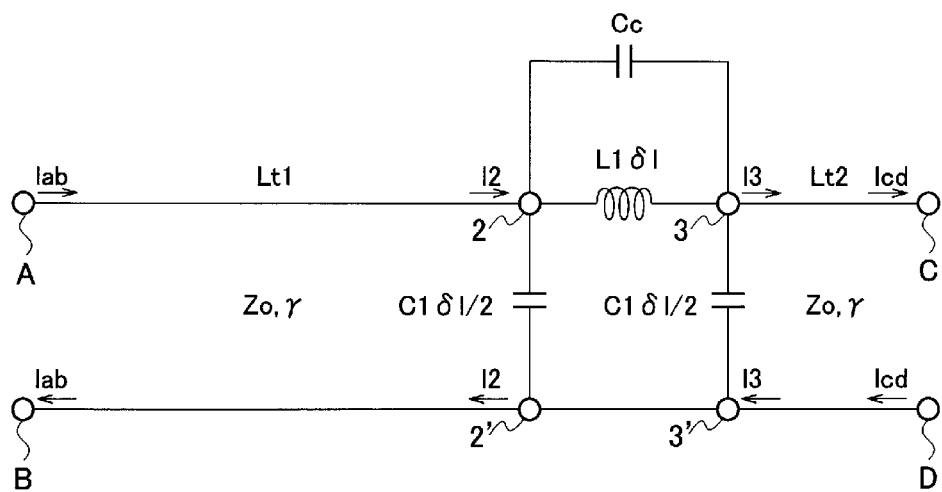
FIG. 3 is a diagram showing a circuit model of FIG. 2.

A principle of an operation of detecting a crack will be described. FIG. 2 shows a schematic diagram (top view) of the transducer 40 in which a crack exists, and FIG. 3 shows a circuit model of the transducer 40 in which a crack exists. The schematic diagram of FIG. 2 is a front view of the transducer 40 shown in FIG. 7 when viewed from a front, and shows a state where a crack CK having a gap $\delta l$ is generated, due to a crack generated in the structure 5, at a location distant by Lt1 from a left end of the upper conductor and distant by Lt2 from a right end thereof. In the circuit model of FIG. 3, Cc represents spray capacitance existing in the gap of the crack, and L1 and C1 represent inductance and capacitance per unit length when the connected portion in FIG. 2 is regarded as a transmission line, respectively. Characteristic impedance of the transmission lines of the lengths Lt1 and Lt2 is defined as Zo (a real number), and a propagation constant is defined as $\gamma$ (a complex number).

A potential difference between the terminals A and B is defined as Vab, a potential difference between terminals 2 and 2' is defined as V2, a potential difference between terminals 3 and 3' is defined as V3, and a potential difference between terminals C and D is defined as Vcd. Further, a current flowing along the transmission line at the terminal A is defined as Iab, a current on the transmission line at the terminal 2 is defined as I2, a current on the transmission line at the terminal 3 is defined as I3, a current flowing along the transmission line at the terminal C is defined as Icd. According to a theory of a distributed constant circuit, the current Iab flows to the terminal B in a reverse direction. Similarly, the current I2 flows to the terminal 2' in a reverse direction, the current I3 flows in the terminal 3' in a reverse direction, and the current Icd flows to the terminal D in a reverse direction. In this circuit model, circuit Equations (1) to (10) hold.

Formula 4

$$Vab = K1 + K2 \tag{1}$$

$$Iab = \frac{K1}{Zo} - \frac{K2}{Zo} \tag{2}$$

$$V2 = K1e^{-\gamma Lt1} + K2e^{\gamma Lt1} \tag{3}$$

$$I2 + \frac{K1}{Zo}e^{-\gamma Lt1} - \frac{K2}{Zo}e^{\gamma Lt1} \tag{4}$$

$$I2 = j\omega \frac{C1}{2}\delta lV2 + \frac{1}{i\omega L1\delta l}(V2 - V3) + j\omega Cc(V2 - V3) \tag{5}$$

$$I3 = -j\omega \frac{C1}{2}\delta lV3 + \frac{1}{i\omega L1\delta l}(V2 - V3) + j\omega Cc(V2 - V3) \tag{6}$$

$$V3 = K3 + K4 \tag{7}$$

$$I3 = \frac{K3}{Zo} - \frac{K4}{Zo} \tag{8}$$

$$Vcd = K3e^{-\gamma Lt2} + K4e^{\gamma Lt2} \tag{9}$$

$$Icd + \frac{K3}{Zo}e^{-\gamma Lt2} - \frac{K4}{Zo}e^{\gamma Lt2} \tag{10}$$

Here, K1 and K2 are constants determined by a boundary condition of the transmission line of the length Lt1, and K3 and K4 are constants determined by a boundary condition of the transmission line of the length Lt2. In the above equation, the number e represents the base of the natural logarithm (Napier's constant).

Since the terminals C and D are open, the current Icd is 0, and a relation between K3 and K4 becomes Equation (11) from Equation (10).

Formula 5

$$K3 = K4e^{2\gamma Lt2} \tag{11}$$

Equation (12) can be obtained by substitution of Equation (11) into Equation (8).

Formula 6

$$V3 = K4 e^{2\gamma Lt2} + K4 \qquad (12)$$

Similarly, Equation (13) can be obtained by substitution of Equation (11) into Equation (9).

Formula 7

$$I3 = \frac{K4 e^{2\gamma Lt2}}{Zo} - \frac{K4}{Zo} \qquad (13)$$

When Equation (12) is divided by Equation (13), a relational equation between V3 and I3 is as indicated by Equation (14).

Formula 8

$$\frac{V3}{I3} = \frac{K4 e^{2\gamma Lt2} + K4}{\frac{K4 e^{2\gamma Lt2}}{Zo} - \frac{K4}{Zo}} = \qquad (14)$$

$$Zo \frac{e^{2\gamma Lt2} + 1}{e^{2\gamma Lt2} - 1} = Zo \frac{e^{\gamma Lt2} + e^{-\gamma Lt2}}{e^{\gamma Lt2} - e^{-\gamma Lt2}} = Zo \coth(\gamma Lt2)$$

$$V3 = Zo I3 \coth(\gamma Lt2)$$

From Equation (6), V2 is represented by Equation (15) using V3 and I3.

Formula 9

$$I3 = \left(\frac{1}{j\omega L1\delta l} + j\omega Cc\right) V2 - \left\{\frac{1}{j\omega L1\delta l} + j\omega\left(Cc + \frac{C1}{2}\delta l\right)\right\} V3 \qquad (15)$$

$$\frac{1 - \omega^2 L1\delta l Cc}{j\omega L1\delta l} V2 = I3 + \frac{1}{j\omega L1\delta l}\left\{1 - \omega^2 L1\delta l\left(Cc + \frac{C1}{2}\delta l\right)\right\} V3$$

$$V2 = \frac{j\omega L1\delta l}{1 - \omega^2 L1\delta l Cc} I3 + \frac{1 - \omega^2 L1\delta l\left(Cc + \frac{C1}{2}\delta l\right)}{1 - \omega^2 L1\delta l Cc} V3$$

From Equation (7), I2 is represented by Equation (16) using V3 and I3.

Formula 10

$$I2 = \left\{\frac{1}{j\omega L1\delta l} + j\omega\left(Cc + \frac{C1}{2}\delta l\right)\right\} V2 - \left(\frac{1}{j\omega L1\delta l} + j\omega Cc\right) V3 \qquad (16)$$

$$I2 = \frac{1 - \omega^2 L1\delta l\left(Cc + \frac{C1}{2}\delta l\right)}{j\omega L1\delta l} V2 - \frac{1 - \omega^2 L1\delta l Cc}{j\omega L1\delta l} V3$$

$$I2 = \frac{1 - \omega^2 L1\delta l\left(Cc + \frac{C1}{2}\delta l\right)}{1 - \omega^2 L1\delta l Cc} I3 +$$

$$\frac{\left\{1 - \omega^2 L1\delta l\left(Cc + \frac{C1}{2}\delta l\right)\right\}^2}{1 - \omega^2 L1\delta l Cc} V3 - \frac{1 - \omega^2 L1\delta l Cc}{j\omega L1\delta l} V3$$

$$I2 = \frac{1 - \omega^2 L1\delta l\left(Cc + \frac{C1}{2}\delta l\right)}{1 - \omega^2 L1\delta l Cc} I3 +$$

-continued $$\frac{\left\{1 - \omega^2 L1\delta l\left(Cc + \frac{C1}{2}\delta l\right)\right\}^2 - (1 - \omega^2 L1\delta l Cc)^2}{j\omega L1\delta l(1 - \omega^2 L1\delta l Cc)} V3$$

$$I2 = \frac{1 - \omega^2 L1\delta l\left(Cc + \frac{C1}{2}\delta l\right)}{1 - \omega^2 L1\delta l Cc} I3 +$$

$$\frac{\left\{2 - \omega^2 L1\delta l\left(2Cc + \frac{C1}{2}\delta l\right)\right\}\left(-\omega^2 L1\delta l \frac{C1}{2}\delta l\right)}{j\omega L1\delta l(1 - \omega^2 L1\delta l Cc)} V3$$

$$I2 = \frac{1 - \omega^2 L1\delta l\left(Cc + \frac{C1}{2}\delta l\right)}{1 - \omega^2 L1\delta l Cc} I3 + \frac{\left\{1 - \omega^2 L1\delta l\left(Cc + \frac{C1}{4}\delta l\right)\right\}(j\omega C1\delta l)}{1 - \omega^2 L1\delta l Cc} V3$$

Here, using parameters of Equations (17) to (19), Equations (15) and (16) are represented by Equations (20) and (21), respectively.

Formula 11

$$Za = Zo\left\{1 - \omega^2 L1\delta l\left(Cc + \frac{C1}{2}\delta l\right)\right\} \qquad (17)$$

$$L2 = C1 Zo^2\left\{1 - \omega^2 L1\delta l\left(Cc + \frac{C1}{4}\delta l\right)\right\} \qquad (18)$$

$$\eta = 1 - \omega^2 L1\delta l Cc \qquad (19)$$

$$V2 = \frac{j\omega L1\delta l}{\eta} I3 + \frac{Za}{Zo\eta} V3 \qquad (20)$$

$$I2 = \frac{Za}{Zo\eta} I3 + \frac{j\omega L2\delta l}{Zo^2 \eta} V3 \qquad (21)$$

From Equations (3) and (4), K1 and K2 are represented by Equations (22) and (23), respectively.

Formula 12

$$K1 = \frac{e^{\gamma L1 t}}{2}(V2 + Zo I2) \qquad (22)$$

$$K1 = \frac{e^{\gamma L1 t}}{2}\left(\frac{j\omega L1\delta l}{\eta} I3 + \frac{Za}{Zo\eta} V3 + \frac{Za}{\eta} I3 + \frac{j\omega L2\delta l}{Zo\eta} V3\right)$$

$$K1 = \frac{e^{\gamma L1 t}}{2}\left(\frac{Za + j\omega L1\delta l}{\eta} I3 + \frac{Za + j\omega L2\delta l}{Zo\eta} V3\right)$$

$$K2 = \frac{e^{-\gamma L1 t}}{2}(V2 - Zo I2) \qquad (23)$$

$$K2 = \frac{e^{-\gamma L1 t}}{2}\left(\frac{j\omega L1\delta l}{\eta} I3 + \frac{Za}{Zo\eta} V3 - \frac{Za}{\eta} I3 - \frac{j\omega L2\delta l}{Zo\eta} V3\right)$$

$$K2 = \frac{e^{-\gamma L1 t}}{2}\left(\frac{-Za + j\omega L1\delta l}{\eta} I3 + \frac{Za - j\omega L2\delta l}{Zo\eta} V3\right)$$

Here, when Lp=L1+L2 and Ln=−L1+L2, L1=(Lp−Ln)/2 and L2=(Lp+Ln)/2 and then Equations (22) and (23) are represented by Equations (24) and (25), respectively.

Formula 13

$$K1 = \frac{e^{\gamma L1t}}{2}\left\{\frac{Za + j\omega(Lp - Ln)\delta l/2}{\eta}I3 + \frac{Za + j\omega(Lp + Ln)\delta l/2}{Zo\eta}V3\right\} \quad (24)$$

$$K2 = \frac{e^{-\gamma L1t}}{2}\left\{\frac{-Za + j\omega(Lp - Ln)\delta l/2}{\eta}I3 + \frac{Za - j\omega(Lp + Ln)\delta l/2}{Zo\eta}V3\right\} \quad (25)$$

By substitution of Equations (14), (24), and (23) into Equation (1), Equation (26) can be obtained for Vab.

Formula 14

$$Vab = \frac{e^{\gamma L1t}}{2}\left\{\frac{Za + \frac{j\omega(Lp-Ln)\delta l}{2}}{\eta}I3 + \frac{Za + \frac{j\omega(Lp+Ln)\delta l}{2}}{Zo\eta}ZoI3\coth(\gamma Lt2)\right\} +$$

$$\frac{e^{-\gamma L1t}}{2}\left\{\frac{-Za + \frac{j\omega(Lp-Ln)\delta l}{2}}{\eta}I3 + \frac{Za - \frac{j\omega(Lp+Ln)\delta l}{2}}{Zo\eta}ZoI3\coth(\gamma Lt2)\right\}$$

$$= \frac{Za}{\eta}I3\left\{\frac{e^{\gamma L1t} - e^{-\gamma L1t}}{2} + \frac{e^{\gamma L1t} + e^{-\gamma L1t}}{2}\coth(\gamma Lt2)\right\} +$$

$$\frac{j\omega Lp\delta l}{2\eta}I3\left\{\frac{e^{\gamma L1t} + e^{-\gamma L1t}}{2} + \frac{e^{\gamma L1t} - e^{-\gamma L1t}}{2}\coth(\gamma Lt2)\right\} +$$

$$\frac{j\omega Ln\delta l}{2\eta}I3\left\{\frac{-e^{\gamma L1t} - e^{-\gamma L1t}}{2} + \frac{e^{\gamma L1t} - e^{-\gamma L1t}}{2}\coth(\gamma Lt2)\right\}$$

$$= \frac{Za}{\eta}I3\{\sinh(\gamma Lt1) + \cosh(\gamma Lt1)\coth(\gamma Lt2)\} +$$

$$\frac{j\omega Lp\delta l}{2\eta}I3\{\cosh(\gamma Lt1) + \sinh(\gamma Lt1)\coth(\gamma Lt2)\} +$$

$$\frac{j\omega Ln\delta l}{2\eta}I3\{-\cosh(\gamma Lt1) + \sinh(\gamma Lt1)\coth(\gamma Lt2)\}$$

$$= \frac{Za}{\eta\sin(\gamma Lt2)}I3\{\sinh(\gamma Lt1)\sinh(\gamma Lt2) + \cosh(\gamma Lt1)\cosh(\gamma Lt2)\} +$$

$$\frac{j\omega Lp\delta l}{2\eta\sin(\gamma Lt2)}I3\{\cosh(\gamma Lt1)\sinh(\gamma Lt2) + \sinh(\gamma Lt1)\cosh(\gamma Lt2)\} +$$

$$\frac{j\omega Ln\delta l}{2\eta\sin(\gamma Lt2)}I3\{-\cosh(\gamma Lt1)\sinh(\gamma Lt2) + \sinh(\gamma Lt1)\cosh(\gamma Lt2)\}$$

$$Vab = \frac{Za}{\eta\sin(\gamma Lt2)}I3\cosh[\gamma(Lt1 + Lt2)] +$$

$$\frac{j\omega Lp\delta l}{2\eta\sin(\gamma Lt2)}I3\sinh[\gamma(Lt1 + Lt2)] +$$

$$\frac{j\omega Ln\delta l}{2\eta\sin(\gamma Lt2)}I3\sinh[\gamma(Lt1 - Lt2)]$$

Here, when parameters of Equations (27) and (28) are introduced, Equation (26) can be expanded as Equation (29).

Formula 15

$$Az = Za + j\omega\frac{Lp}{2}\delta l \quad (27)$$

$$\theta z = \tan^{-1}\left(\frac{\omega Lp\delta l}{2Za}\right)$$

$$Za = |Az|\cos\theta z = |Az|\cosh(j\theta z)$$

$$\omega\frac{Lp}{2}\delta l = |Az|\sin\theta z = \frac{1}{j}|Az|\sinh(j\theta z)$$

$$Vab = \frac{I3}{\eta\sin(\gamma Lt2)}|Az|\cosh(j\theta z)\cosh[\gamma(Lt1 + Lt2)] + \quad (28)$$

$$\frac{jI3}{\eta\sin(\gamma Lt2)}\frac{1}{j}|Az|\sinh(j\theta z)\sinh[\gamma(Lt1 + Lt2)] +$$

$$\frac{j\omega Ln\delta l}{2\eta\sin(\gamma Lt2)}I3\sinh\{\gamma(Lt1 - Lt2)\} = \frac{I3|Az|}{\eta\sin(\gamma Lt2)}$$

$$\{\cosh(j\theta z)\cosh[\gamma(Lt1 + Lt2)] + \sinh(j\theta z)\sinh[\gamma(Lt1 + Lt2)]\} +$$

$$\frac{j\omega Ln\delta l}{2\eta\sin(\gamma Lt2)}I3\sinh[\gamma(Lt1 - Lt2)]$$

$$Vab = \frac{I3|Az|}{\eta\sin(\gamma Lt2)}\cosh\{\gamma(Lt1 + Lt2) + j\theta z\} + \quad (29)$$

$$\frac{j\omega Ln\delta l}{2\eta\sin(\gamma Lt2)}I3\sinh\{\gamma(Lt1 - Lt2)]\}$$

By substitution of Equations (14), (24), and (23) into Equation (2), the following Equation can be obtained for Iab.

Formula 16

$$Iab = \frac{e^{\gamma L1t}}{2Zo}\left\{\frac{Za + \frac{j\omega(Lp-Ln)\delta l}{2}}{\eta}I3 + \frac{Za + \frac{j\omega(Lp+Ln)\delta l}{2}}{Zo\eta}ZoI3\coth(\gamma Lt2)\right\} -$$

$$\frac{e^{-\gamma L1t}}{2Zo}\left\{\frac{-Za + \frac{j\omega(Lp-Ln)\delta l}{2}}{\eta}I3 + \frac{Za - \frac{j\omega(Lp+Ln)\delta l}{2}}{Zo\eta}ZoI3\coth(\gamma Lt2)\right\}$$

$$= \frac{Za}{\eta Zo}I3\left\{\frac{e^{\gamma L1t} + e^{-\gamma L1t}}{2} + \frac{e^{\gamma L1t} - e^{-\gamma L1t}}{2}\coth(\gamma Lt2)\right\} +$$

$$\frac{j\omega Lp\delta l}{2\eta Zo}I3\left\{\frac{e^{\gamma L1t} - e^{-\gamma L1t}}{2} + \frac{e^{\gamma L1t} + e^{-\gamma L1t}}{2}\coth(\gamma Lt2)\right\} +$$

$$\frac{j\omega Ln\delta l}{2\eta Zo}I3\left\{\frac{-e^{\gamma L1t} + e^{-\gamma L1t}}{2} + \frac{e^{\gamma L1t} + e^{-\gamma L1t}}{2}\coth(\gamma Lt2)\right\}$$

$$= \frac{Za}{\eta Zo}I3\{\cosh(\gamma Lt1) + \sinh(\gamma Lt1)\coth(\gamma Lt2)\} +$$

$$\frac{j\omega Lp\delta l}{2\eta Zo}I3\{\sinh(\gamma Lt1) + \cosh(\gamma Lt1)\coth(\gamma Lt2)\} +$$

$$\frac{j\omega Ln\delta l}{2\eta Zo}I3\{-\sinh(\gamma Lt1) + \cosh(\gamma Lt1)\coth(\gamma Lt2)\}$$

$$= \frac{Za}{\eta Zo\sinh(\gamma Lt2)}I3\sinh\{\gamma(Lt1 + Lt2)\} +$$

$$\frac{j\omega Lp\delta l}{2\eta Zo\sinh(\gamma Lt2)} I3\cosh\{\gamma(Lt1+Lt2)\} +$$

$$\frac{j\omega Ln\delta l}{2\eta Zo\sinh(\gamma Lt2)} I3\cosh\{\gamma(Lt1+Lt2)\}$$

When expanded using Equations (27) and (28), Iab is expressed as indicated by Equation (30).

Formula 17

$$Iab = \frac{I3}{\eta Zo\sinh(\gamma Lt2)}|Az|\cosh(j\theta z)\sinh\{\gamma(Lt1+Lt2)\} + \quad (30)$$

$$\frac{jI3}{\eta Zo\sinh(\gamma Lt2)}\frac{1}{j}|Az|\sinh(j\theta z)\cosh\{\gamma(Lt1+Lt2)\} +$$

$$\frac{j\omega Ln\delta l}{2\eta Zo\sinh(\gamma Lt2)} I3\cosh\{\gamma(Lt1-Lt2)\}$$

$$= \frac{I3|Az|}{\eta Zo\sinh(\gamma Lt2)}\{\cosh(j\theta z)\sinh\{\gamma(Lt1+Lt2)\} +$$

$$\sinh(j\theta z)\cosh\{\gamma(Lt1+Lt2)\}\} +$$

$$\frac{j\omega Ln\delta l}{2\eta Zo\sinh(\gamma Lt2)} I3\cosh\{\gamma(Lt1-Lt2)\}$$

$$Iab = \frac{I3|Az|}{\eta Zo\sinh(\gamma Lt2)}\sinh\{\gamma(Lt1+Lt2)+j\theta z\} +$$

$$\frac{j\omega Ln\delta l}{2\eta Zo\sinh(\gamma Lt2)} I3\cosh\{\gamma(Lt1-Lt2)\}$$

From Equations (29) and (30), impedance Zab=Vab/Iab viewed from the terminals A and B is represented by Equation (31).

Formula 18

$$Zab = \frac{|Az|\cosh\{\gamma(Lt1+Lt2)+j\theta z\} + \frac{j\omega Ln\delta l}{2}\sinh\{\gamma(Lt1-Lt2)\}}{|Az|\sinh\{\gamma(Lt1+Lt2)+j\theta z\} + \frac{j\omega Ln\delta l}{2}\cosh\{\gamma(Lt1-Lt2)\}} \quad (31)$$

As in the equation expansion of Equations (A-2) and (A-3), when $\gamma=\alpha+j\beta$ where $\alpha$ is a damping constant (real number), $\beta$ is a phase constant (real number), and j is $(-1)^{0.5}$, a numerator of the impedance Zab can be expanded as indicated by Equation (32).

Formula 19

$$\text{Numerator of } Zab = |Az|\cosh\{\alpha(Lt1+Lt2)+j\beta(Lt1+Lt2)+j\theta z\} + \quad (32)$$

$$\frac{j\omega Ln\delta l}{2}\sinh\{\alpha(Lt1-Lt2)+j\beta(Lt1-Lt2)\}$$

$$= |Az|\{\cosh[\alpha(Lt1+Lt2)]\cosh[j\beta(Lt1+Lt2)+j\theta z] +$$

$$\sinh[\alpha(Lt1+Lt2)]\sinh[j\beta(Lt1+Lt2)+j\theta z]\} +$$

$$\frac{j\omega Ln\delta l}{2}\{\sinh[\alpha(Lt1-Lt2)]\cosh[j\beta(Lt1-Lt2)] +$$

$$\cosh[\alpha(Lt1-Lt2)]\sinh[j\beta(Lt1-Lt2)]\}$$

$$\text{Numerator of } Zab = |Az|\{\cosh[\alpha(Lt1+Lt2)]\cos[\beta(Lt1+Lt2)+\theta z] +$$

$$j\sinh[\alpha(Lt1+Lt2)]\sin[\beta(Lt1+Lt2)+\theta z]) +$$

$$\frac{j\omega Ln\delta l}{2}\{\sinh[\alpha(Lt1-Lt2)]\cos[\beta(Lt1-Lt2)] +$$

$$j\cosh[\alpha(Lt1-Lt2)]\sin[\beta(Lt1-Lt2)]\}$$

A denominator of the impedance Zab can be expanded as indicated by Equation (33).

Formula 20

$$\quad (33)$$

$$\text{Denominator of } Zab = |Az|\sinh\{\alpha(Lt1+Lt2)+j\beta(Lt1+Lt2)+j\theta z\} +$$

$$\frac{j\omega Ln\delta l}{2}\cosh\{\alpha(Lt1-Lt2)+j\beta(Lt1-Lt2)\}$$

$$= |Az|\{\sinh[\alpha(Lt1+Lt2)]\cosh[j\beta(Lt1+Lt2)+j\theta z] +$$

$$\cosh[\alpha(Lt1+Lt2)]\sinh[j\beta(Lt1+Lt2)+j\theta z]\} +$$

$$\frac{j\omega Ln\delta l}{2}\{\cosh[\alpha(Lt1-Lt2)]\cosh[j\beta(Lt1-Lt2)] +$$

$$\sinh[\alpha(Lt1-Lt2)]\sinh[j\beta(Lt1-Lt2)]\}$$

$$\text{Denominator of } Zab = |Az|\{\sinh[\alpha(Lt1+Lt2)]\cos[\beta(Lt1+Lt2)+\theta z] +$$

$$j\cosh[\alpha(Lt1+Lt2)]\sin[\beta(Lt1+Lt2)+\theta z]\} +$$

$$\frac{j\omega Ln\delta l}{2}\{\cosh[\alpha(Lt1-Lt2)]\cos[\beta(Lt1-Lt2)] +$$

$$j\sinh[\alpha(Lt1-Lt2)]\sin[\beta(Lt1-Lt2)]\}$$

When a crack exists, variables of a trigonometrical function included in the denominator and the numerator of the equation of the impedance Zab of the transmission line are two types of $\{\beta(Lt1+Lt2)+\theta z\}$ and $\beta(Lt1-Lt2)$. On the other hand, when no crack exists and no attachment (parasitic capacitance Cp) exists at an end of the transmission line, a variable of the trigonometrical function included in the equation of the impedance is one type of $\beta Lt$ from Equation (A-2), and a variable of the trigonometrical function included in the equation of the impedance is one type of $(\beta Lt+\omega CpZo)$ from Equation (A-3) when no crack exists and an attachment (parasitic capacitance Cp) exist at the end of the transmission line. From such a consideration, it can be seen that the number of variables of the trigonometrical function included in the equation of the impedance changes depending on the presence or absence of the crack. Here, Lt represents the length of the transmission line, and satisfies a relation of $Lt=Lt1+Lt2+\delta l$.

Next, the periodicity of the impedance peak will be considered. A period of the impedance peak when no crack exists is considered from a relation of $\beta=\omega(LoCo)^{0.5}$ and the variables of the trigonometrical function included in the equation of the impedance, and is $(LoCo)^{0.5}Lt$ when no parasitic capacitance Cp exists and $(LoCo)^{0.5}Lt+CpZo$ when the parasitic capacitance Cp exists, which is constant regardless of the frequency.

In contrast, when the crack exists, a period at which the impedance becomes a peak is $(LoCo)^{0.5}(Lt1-Lt2)$ for $\beta(Lt1-Lt2)$ which is the component of the two variables. The component of $\{\beta(Lt1+Lt2)+\theta z\}$ can be considered as follows.

A parameter θz represented by Equation (34) below is represented as indicated by Equation (35) using Lp=L1+L2, Equations (17) and (18).

Formula 21

$$\theta z = \tan^{-1}\left(\frac{\omega Lp\delta l}{2Za}\right) \quad (34)$$

$$\theta z = \tan^{-1}\left\{\omega\delta l\frac{L1 + C1Zo^2[1 - \omega^2 L1\delta l(Cc + C1\delta l/4)]}{2Zo[1 - \omega^2 L1\delta l(Cc + C1\delta l/2)]}\right\} \quad (35)$$

When the crack generated in the structure is still in an early stage and the gap δl of the crack is very short, the approximation of Equation (36) holds.

Formula 22

$$\theta z \cong \omega\delta l\frac{L1 + C1Zo^2[1 - \omega^2 L1\delta l(Cc + C1\delta l/4)]}{2Zo[1 - \omega^2 L1\delta l(Cc + C1\delta l/2)]} \quad (36)$$

Further, Equation (36) becomes Equation (37) and θz is directly proportional to a frequency in a region where a frequency $\omega/2\pi$ is low.

Formula 23

$$\theta z \cong \omega\delta l\frac{L1 + C1Zo^2}{2Zo} \quad (37)$$

Therefore, a period of the component of $\{\beta(Lt1+Lt2)+\theta z\}$ is $\{(LoCo)^{0.5}(Lt1+Lt2)+(L1+C1Zo^2) \delta l/(2Zo)\}$ in the region where the crack generated in the structure is still in an early stage, the gap δl of the crack is very short, and the frequency is low.

For this reason, when a crack is generated, two types of periodicity occur on the frequency dependency of the impedance. Of the two types of periodicity, $\{(LoCo)^{0.5}(Lt1+Lt2)+(L1+C1Zo^2) \delta l/(2Zo)\}$ depends on the length of the transmission line, and is similar to $(LoCo)^{0.5}Lt$ or $(LoCo)^{0.5}Lt+CoZo$ when no crack exists in that it depends on the length of the transmission line. In contrast, $(LoCo)^{0.5}(Lt1-Lt2)$, which is the other periodicity when a crack exists, depends on the difference in the length from the end of the transmission line to the crack, and has different characteristics from the periodicity when no crack exists.

In order to distinguish from the case where no crack is generated, using the above characteristics, the sensor terminal 1 determines that a crack is generated when periodicity different from the periodicity, which can be predicted from the length of the transmission line, is observed at a plurality of peak values of the acquired frequency characteristic of the impedance of the transducer.

Operation of Processing Crack Detection (Initial Scan State S1)

When the sensor terminal 1 is activated after the sensor terminal 1 and the transducer 40 are provided on the structure to be monitored, the sensor terminal 1 is in the initial scan state S1, and acquires a frequency characteristic of the impedance of the transducer 40 in a predetermined frequency range.

Figure 4:
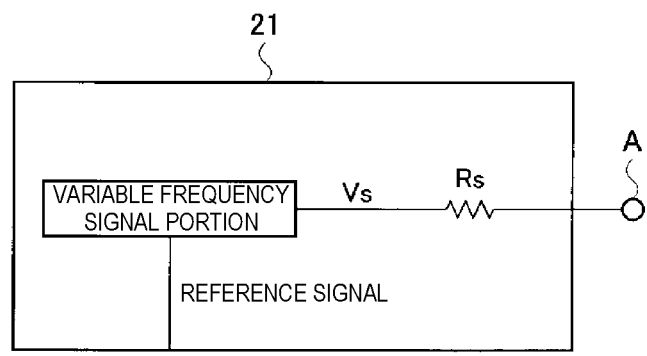
FIG. 4 is a diagram showing a specific example of a variable frequency signal source.

In the embodiment of FIG. 1, the crack detection processing unit 10 transmits output signal data including at least a frequency setting value to the variable frequency signal source 21 of the impedance measurement unit 20 at the beginning of acquisition of the frequency characteristic of the impedance, and outputs an electric signal having a frequency at one end of the predetermined frequency range to the transducer from the variable frequency signal source 21 via the terminal A. The electric signal used herein may be a current, or may be an electric signal that is output a voltage Vs to the terminal A via a predetermined resistor Rs as in a specific example of the variable frequency signal source 21 shown in FIG. 4.

The impedance measurement unit 20 observes a voltage between the terminal A and the terminal B with the quadrature demodulation portion 22, and outputs a quadrature amplitude signal, which is separated into an in-phase component amplitude and a quadrature component amplitude based on the reference signal, to the impedance calculation portion 23. The impedance calculation portion 23 generates impedance data based on the input quadrature amplitude signal, and transmits the data to the crack detection processing unit 10.

After receiving the impedance data, the crack detection processing unit 10 in the initial scan state S1 stores the impedance data in association with the frequency setting value of the output signal data transmitted by itself. Thereafter, impedance data is acquired by sequentially changing the frequency toward the other end of the predetermined frequency range, a data row of impedance data with respect to the frequency is formed.

The crack detection processing unit 10 acquires periodicity of the impedance from the frequency characteristic of the impedance calculated based on the formed data row of the impedance data with respect to the frequency. A method of acquiring the periodicity may be Fourier series expansion or discrete Fourier transform, or may be calculated from a frequency interval of the impedance peak value. The crack detection processing unit 10 stores the acquired periodicity in the impedance periodicity data storage portion 11.

(Steady Monitoring State S2)

Next, the crack detection processing unit 10 determines, from a plurality of frequency-dependent peak values of the impedance obtained in the initial scan state S1, a specific frequency to be monitored in the steady monitoring state S2. In the present embodiment, when the predetermined frequency is scanned in the steady monitoring state S2, the measurement time becomes longer and the power consumption increases, so that only the specific frequency is monitored. When the periodicity of the frequency characteristic of the impedance changes, the frequency at which the impedance becomes a peak also changes. Therefore, when the impedance at a specific frequency, which has an impedance peak value in the initial scan state, is monitored in the steady monitoring state S2, the presence or absence of the change in the periodicity of the frequency characteristic of the impedance can be monitored.

A method of determining the specific frequency may be a method of determining a minimum frequency out of the frequencies at which the impedance becomes a peak or an N-th frequency. The crack detection processing unit 10 stores the determined specific frequency and the impedance peak value at the frequency in the monitoring frequency storage portion 12.

In the steady monitoring state S2, the crack detection processing unit 10 outputs output signal data for setting the characteristic frequency stored in the monitoring frequency storage portion 12 to the variable frequency signal source 21, and outputs an electric signal having a specific frequency from the variable frequency signal source 21 to the transducer via the terminal A. The operations of the quadrature demodulation portion 22 and the impedance calculation portion 23 are the same as those in the initial scan state S1, and thus a description thereof will not be presented.

When receiving the impedance data, the crack detection processing unit 10 in the steady monitoring state S2 transitions to the crack detection scan state S3 when the difference between the magnitude of the impedance calculated based on the received impedance data and the peak value of the impedance at the monitoring frequency stored in the monitoring frequency storage portion 12 exceeds a predetermined amount. In contrast, when the difference does not exceed the predetermined amount, the operation in the steady monitoring state S2 is executed after a certain period of rest.

(Crack Detection Scan State S3 and Peak Periodicity Calculation State S4)

In the crack detection scan state S3, first, the crack detection processing unit 10 acquires a frequency characteristic of impedance in a predetermined frequency range. A method of acquiring the frequency characteristic of the impedance is the same as that in the initial scan state S1, and thus a description thereof will not be presented.

Next, after transition to the peak periodicity calculation state S4, the crack detection processing unit 10 calculates, in the peak periodicity calculation state S4, periodicity from the acquired frequency characteristic of the impedance, determines that a crack is generated when periodicity other than the periodicity stored in the impedance periodicity data storage portion 11 is present, and transitions to the crack detection determination state S5. When the periodicity calculated from the acquired frequency characteristic of the impedance is not different from the periodicity stored in the impedance periodicity data storage portion 11, the crack detection processing unit 10 transitions to the steady monitoring state S2.

Figure 5:
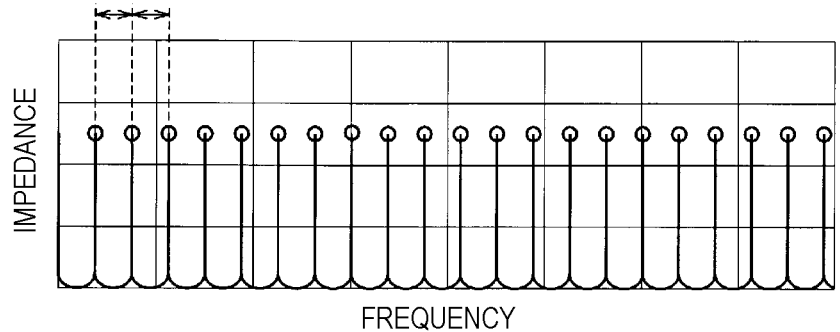
FIG. 5 is a diagram showing an example of a frequency characteristic of impedance.
Figure 5:
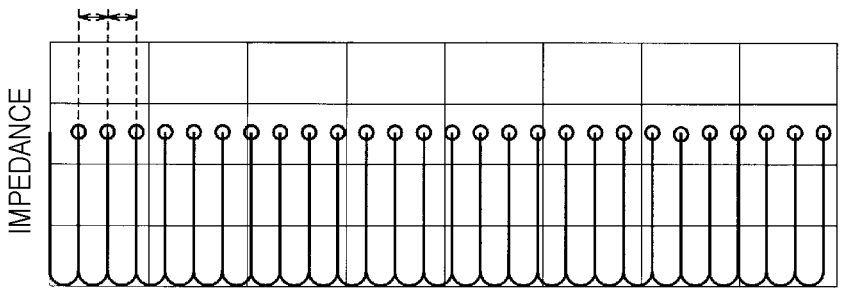
Figure 5:
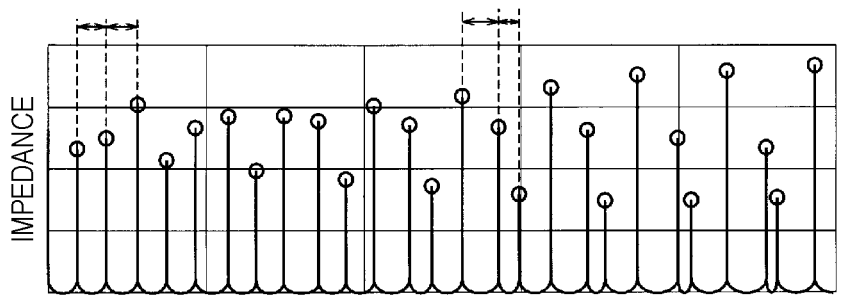

A method of calculating the periodicity of the frequency characteristic of the impedance may be Fourier series expansion or discrete Fourier transform, or may be calculated from a frequency interval of the impedance peak value. As an example, the method of calculating the periodicity from the frequency interval of the impedance peak value will be described. FIG. 5 shows an example of a frequency characteristic of impedance. FIG. 5(a) shows a frequency characteristic of impedance when no crack exists in the transmission line and no attachment exists at the end of the transmission line, and FIG. 5(b) shows a frequency characteristic of impedance when no crack exists and an attachment (Cp) exists at the end of the transmission line. In addition, FIG. 5(c) shows a frequency characteristic of impedance when a crack exists. Circles in the drawings indicate peak positions of the impedance.

In such a method of calculating the periodicity, first, a frequency, at which the impedance becomes a peak, is obtained from the frequency characteristic of the impedance, and then a frequency difference between peaks is obtained. In the case where no cracks and no attachments exists in the transmission line as shown in FIG. 5(a), the frequency difference between impedance peaks is constant even when the frequency changes. In the case where no crack exists and the attachment exists at the end as shown in FIG. 5(b), the frequency of the peak is different from that of FIG. 5(a), but the frequency difference between peaks is constant even when the frequency changes. In contrast, in the case where the crack exists as shown in FIG. 5(c), the frequency difference between peaks changes. Using such difference in characteristics, it is determined from the histogram for the frequency difference between the peaks that no crack exists when a frequency variance in the frequency difference between specific peaks is high, and that a crack exists when a frequency variance in the frequency difference between the peaks is wide.

(Crack Detection Determination State S5)

Figure 7:
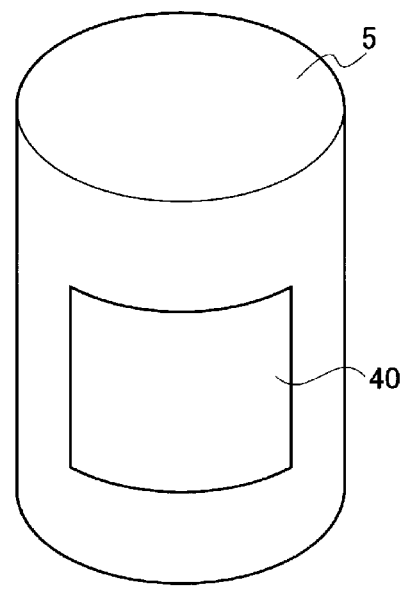
FIG. 7 is a view showing an example in which a transducer is provided on a structure.

In the crack detection determination state S5, the crack detection processing unit 10 generates data including at least the fact that a crack is detected, and transmits the data to the communication unit 30 as transmission data. Then, the communication unit 30 transmits the transmission data to the monitoring server 7 via the communication network 6 as shown in FIG. 7.

Effects

With the above-described operation, when the sensor terminal of the present embodiment is used, it is possible to calculate the periodicity data regarding the periodicity of the frequency, at which the impedance becomes a peak, from the frequency characteristic of the impedance measured by the impedance measurement unit 20, and to detect the presence of the crack in the structure when the data includes periodicity data different from the periodicity data that are initially measured, thereby distinguishing a case where a crack exists from other cases (when no crack exists and a dielectric such as water adheres to the end of the transducer).

In the above description, the case where the peak value of the impedance changes due to the attachment is compared in the case where no crack exists, but the peak value of the impedance also changes when the dielectric constant of the insulator of the transducer changes with temperature. Since the case is equivalent to the change in the propagation constant and the change in the characteristic impedance in Equation (A-2), two types of periodicity do not occur in the periodicity of the frequency characteristic of the impedance unlike the case where the crack is generated. Accordingly, in the present invention, it is possible to distinguish between the case the dielectric changes with temperature/humidity or over time and the case where the crack is generated.

Modification 1

The crack detection processing unit 10 described above transitions to the steady monitoring state S2 when the periodicity calculated from the frequency characteristic of the impedance acquired in the peak periodicity calculation state S4 is not different from the periodicity stored in the impedance periodicity data storage portion 11. Such a method may be used when the period of the intermittent operation in the steady state is sufficiently longer than the time interval at which the dielectric such as water adhered to the end of the transducer disappears or the temperature/humidity change time.

However, when the intermittent period is equal to or shorter than the time interval at which the adhered dielectric such as water disappears or the temperature/humidity change time, it is expected that the impedance value at the specific frequency to be monitored in the steady monitoring state S2 remains low.

Therefore, when the periodicity calculated from the frequency characteristic of the impedance acquired in the peak periodicity calculation state S4 is not different from the periodicity stored in the impedance periodicity data storage portion 11, the crack detection processing unit 10 may determine the specific frequency to be monitored in the steady monitoring state S2 again, store the specific frequency and the peak value of the impedance at the specific frequency in the monitoring frequency storage portion 12, and then transition to the steady monitoring state S2.

Modification 2

Figure 6:
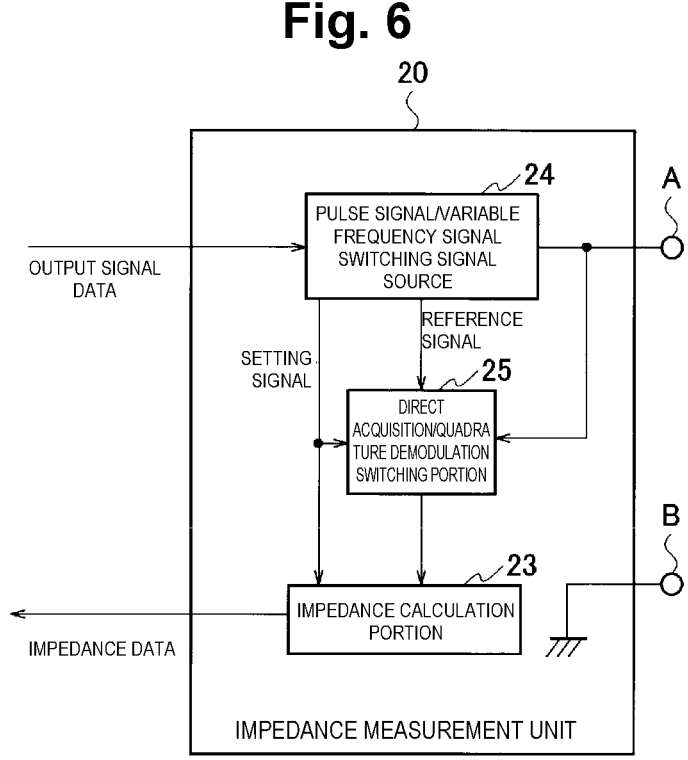
FIG. 6 is a diagram showing a second configuration example of an impedance measurement unit.

FIG. 6 shows a second configuration example of the impedance measurement unit 20. In such a configuration example, when being in the initial scan state S1 or the crack detection scan state S3, the crack detection processing unit 10 outputs a pulse signal to acquire a response signal from the transducer, and then acquires a frequency characteristic of impedance by Fourier transform or the like. In the steady monitoring state S2, an electric signal having a specific frequency is output to the transducer, and impedance at the frequency is acquired.

Specifically, when the crack detection processing unit 10 is in the initial scan state S1 or the crack detection scan state S3, a pulse signal is output to the transducer from a pulse signal/variable frequency signal switching signal source 24 that receives output signal data output from the crack detection processing unit 10. Further, a setting signal indicating that the pulse signal is used is output from the pulse signal/variable frequency signal switching signal source 24 to a direct acquisition/quadrature demodulation switching portion 25 and an impedance calculation portion 23 based on the received output signal data. The direct acquisition/quadrature demodulation switching portion 25 switches to direct acquisition by the setting signal and outputs a response of the transducer to the pulse signal to the impedance calculation portion 23. When the setting signal indicating that the pulse signal is used is input, the impedance calculation portion 23 acquires the response of the transducer to the pulse signal and calculates a frequency characteristic of impedance by Fourier transform or the like. Then, the impedance calculation portion 23 transmits the calculated frequency characteristic of the impedance to the crack detection processing unit 10 as impedance data.

On the other hand, when the crack detection processing unit 10 is in the steady monitoring state S2, the pulse signal/variable frequency signal switching signal source 24 having received the output signal data including data indicating a specific frequency sets a frequency to the specific frequency, and outputs an electric signal to the transducer. Further, a setting signal indicating that a variable frequency signal is used is output from the pulse signal/variable frequency signal switching signal source 24 to the direct acquisition/quadrature demodulation switching portion 25 and the impedance calculation portion 23 based on the received output signal data. The direct acquisition/quadrature demodulation switching portion 25 switches to quadrature demodulation according to the setting signal, and outputs a quadrature amplitude signal, which is separated into an in-phase component amplitude and a quadrature component amplitude based on a reference signal, to the impedance calculation portion 23. The impedance calculation portion 23 generates impedance data based on the input quadrature amplitude signal and transmits the data to the crack detection processing unit 10.

Others

The crack detection processing unit 10 of the present invention can be realized by a computer and a program, and the program can be recorded in a recording medium or provided through a network.

REFERENCE SIGNS LIST 1 sensor terminal (crack detection system)
10 crack detection processing unit
11 impedance periodicity data storage portion
12 monitoring frequency storage portion
20 impedance measurement unit
21 variable frequency signal source
22 quadrature demodulation portion
23 impedance calculation portion
24 pulse signal/variable frequency signal switching signal source
25 direct acquisition/quadrature demodulation switching portion
30 communication unit
40 transducer
41 conductor (upper side)
42 insulator
43 conductor (lower side)
5 structure (target of crack detection)
6 communication network
7 monitoring server

The invention claimed is:

1. A crack detection system that detects, from a crack generated in a transducer provided on a structure, a crack in the structure, the transducer having a three-layered structure of conductor-insulator-conductor, the crack detection system comprising:
    an impedance measurement unit that measures impedance between the two conductors of the transducer; and
    a crack detection processing unit that calculates, from a frequency characteristic of the impedance, periodicity data regarding periodicity of a frequency at which impedance becomes a peak, and detects a presence of a crack in the structure in a case of periodicity data different from initially-measured periodicity data being included,
    wherein the crack detection processing unit is configured to detect that no crack exists in the structure and an attachment is present between the two conductors of the transducer when in the frequency characteristic of the impedance, a peak frequency of impedance is different from an initially measured peak frequency and frequency differences between peak frequencies are constant.

2. The crack detection system according to claim 1, wherein the different periodicity data is data regarding a difference in length from both ends of the transducer to a crack in the transducer.

3. The crack detection system according to claim 1, wherein the crack detection processing unit is configured to:
    in an initial scan state, acquire frequency characteristic of impedance within a predetermined frequency range, store a histogram as periodicity data in an impedance periodicity data storage portion, the histogram indicating a difference between frequencies at which impedance becomes a peak from the acquired frequency characteristic of impedance, determine a specific frequency to be monitored in a steady state using a predetermined method, and store the specific frequency and peak value data of impedance at the specific frequency in a monitoring frequency storage portion;
    in a steady monitoring state, determine a frequency of an AC signal output from the impedance measurement unit based on the specific frequency stored in the monitoring frequency storage portion, generate output transmission data, receives impedance data transmitted from the impedance measurement unit after transmitting the output transmission data to the impedance measurement unit, transition to a crack detection scan state when a magnitude of the impedance included in the impedance data is equal to or smaller than a predetermined threshold value, and continue processing in the steady monitoring state when the magnitude of the impedance is not equal to nor less than the predetermined threshold value;

in a crack detection scan state, acquire a frequency characteristic of impedance within a predetermined frequency range;

in a peak periodicity calculation state, generate a histogram indicating a difference between frequencies at which impedance becomes a peak from the frequency characteristic of the impedance acquired in the crack detection scan state, compare the histogram with the periodicity data stored in the impedance periodicity data storage portion, determine that a crack exists in the structure and then transition to a crack detection determination state when a frequency variance in a difference between frequencies that becomes a peak is large, and transition to the steady monitoring state when the frequency variance in the difference between the frequencies that becomes a peak is small; and in a crack detection determination state, generate data at least including information indicating that a crack exists and transmit the data.

4. The crack detection system according to claim 3, wherein the different periodicity data is data regarding a difference in length from both ends of the transducer to a crack in the transducer.

5. The crack detection system according to claim 1, wherein the impedance measurement unit includes:
a variable frequency signal source that determines a frequency based on data for designating a frequency from the crack detection processing unit and outputs an AC signal to the transducer;
a quadrature demodulation portion that extracts, from an AC voltage applied to the transducer, an in-phase component and a quadrature component based on a reference signal of the variable frequency signal source and outputs a quadrature amplitude signal; and
an impedance calculation portion that calculates impedance from the quadrature amplitude signal, generates impedance data at least including data of the impedance, and transmits the impedance data to the crack detection processing unit.

6. The crack detection system according to claim 5, wherein the different periodicity data is data regarding a difference in length from both ends of the transducer to a crack in the transducer.

7. A crack detection method of detecting, from a crack generated in a transducer provided on a structure, a crack in the structure, the transducer having a three-layered structure of conductor-insulator-conductor, the crack detection method comprising:
by an impedance measurement unit, measuring impedance between the two conductors of the transducer; and
by a crack detection processing unit, calculating, from a frequency characteristic of the impedance, periodicity data regarding periodicity of a frequency at which impedance becomes a peak, and detecting a presence of a crack in the structure in a case of periodicity data different from initially-measured periodicity data being included,
wherein the crack detection processing unit is configured to detect that no crack exists in the structure and an attachment is present between the two conductors of the transducer when in the frequency characteristic of the impedance, a peak frequency of impedance is different from an initially measured peak frequency and frequency differences between peak frequencies are constant.

8. The crack detection method according to claim 7, wherein the impedance measurement unit includes:
a variable frequency signal source that determines a frequency based on data for designating a frequency from the crack detection processing unit and outputs an AC signal to the transducer;
a quadrature demodulation portion that extracts, from an AC voltage applied to the transducer, an in-phase component and a quadrature component based on a reference signal of the variable frequency signal source and outputs a quadrature amplitude signal; and
an impedance calculation portion that calculates impedance from the quadrature amplitude signal, generates impedance data at least including data of the impedance, and transmits the impedance data to the crack detection processing unit.

9. A crack detection system that detects, from a crack generated in a transducer provided on a structure, a crack in the structure, the transducer having a three-layered structure of conductor-insulator-conductor, the crack detection system comprising:
an impedance measurement unit that measures impedance between the two conductors of the transducer; and
a crack detection processing unit that calculates, from a frequency characteristic of the impedance, periodicity data regarding periodicity of a frequency at which impedance becomes a peak, and detects a presence of a crack in the structure in a case of periodicity data different from initially-measured periodicity data being included,
wherein the crack detection processing unit is configured to:
in an initial scan state, acquire frequency characteristic of impedance within a predetermined frequency range, store a histogram as periodicity data in an impedance periodicity data storage portion, the histogram indicating a difference between frequencies at which impedance becomes a peak from the acquired frequency characteristic of impedance, determine a specific frequency to be monitored in a steady state using a predetermined method, and store the specific frequency and peak value data of impedance at the specific frequency in a monitoring frequency storage portion;
in a steady monitoring state, determine a frequency of an AC signal output from the impedance measurement unit based on the specific frequency stored in the monitoring frequency storage portion, generate output transmission data, receives impedance data transmitted from the impedance measurement unit after transmitting the output transmission data to the impedance measurement unit, transition to a crack detection scan state when a magnitude of the impedance included in the impedance data is equal to or smaller than a predetermined threshold value, and continue processing in the steady monitoring state when the magnitude of the impedance is not equal to nor less than the predetermined threshold value;
in a crack detection scan state, acquire a frequency characteristic of impedance within a predetermined frequency range;
in a peak periodicity calculation state, generate a histogram indicating a difference between frequencies at which impedance becomes a peak from the frequency characteristic of the impedance acquired in the crack detection scan state, compare the histogram with the periodicity data stored in the impedance periodicity data storage portion, determine that a crack exists in the structure and then transition to a crack detection determination state when a frequency variance in a difference between frequencies that becomes a peak is large, and transition to the steady monitoring state when the frequency variance in the difference between the frequencies that becomes a peak is small; and in a crack detection determination state, generate data at least including information indicating that a crack exists and transmit the data.

10. The crack detection system according to claim 9, wherein the impedance measurement unit includes:

a variable frequency signal source that determines a frequency based on data for designating a frequency from the crack detection processing unit and outputs an AC signal to the transducer;

a quadrature demodulation portion that extracts, from an AC voltage applied to the transducer, an in-phase component and a quadrature component based on a reference signal of the variable frequency signal source and outputs a quadrature amplitude signal; and an impedance calculation portion that calculates impedance from the quadrature amplitude signal, generates impedance data at least including data of the impedance, and transmits the impedance data to the crack detection processing unit.

11. The crack detection system according to claim 9, wherein the different periodicity data is data regarding a difference in length from both ends of the transducer to a crack in the transducer.

\* \* \* \* \*